United States Patent
Karako et al.

(10) Patent No.: US 10,997,302 B2
(45) Date of Patent: May 4, 2021

(54) PRIVATE AUDIO-VISUAL FEEDBACK FOR USER AUTHENTICATION

(71) Applicant: NEC Corporation Of America, Herzlia (IL)

(72) Inventors: Moshe Karako, Kiryat-Ono (IL); Yaacov Hoch, Ramat-Gan (IL)

(73) Assignee: NEC Corporation Of America, Herzlia (IL)

(*) Notice: Subject to any disclaimer, the term of this patent is extended or adjusted under 35 U.S.C. 154(b) by 198 days.

(21) Appl. No.: 16/026,089

(22) Filed: Jul. 3, 2018

(65) Prior Publication Data
US 2020/0012800 A1    Jan. 9, 2020

(51) Int. Cl.
| G06F 7/04 | (2006.01) |
| G06F 15/16 | (2006.01) |
| G06F 21/60 | (2013.01) |
| H04L 29/06 | (2006.01) |
| G06K 19/07 | (2006.01) |

(52) U.S. Cl.
CPC ....... G06F 21/604 (2013.01); G06K 19/0723 (2013.01); H04L 63/083 (2013.01); H04L 63/0853 (2013.01)

(58) Field of Classification Search
CPC .. G06F 21/604; G06K 19/0723; H04L 63/083
See application file for complete search history.

(56) References Cited

U.S. PATENT DOCUMENTS

| | | | |
|---|---|---|---|
| 8,430,310 B1* | 4/2013 | Ho | G07C 9/00309 235/382 |
| 10,354,126 B1* | 7/2019 | Nagalla | G06Q 20/40145 |
| 10,446,158 B1* | 10/2019 | Edwards | G07F 19/20 |
| 2004/0215968 A1* | 10/2004 | Rodwell | H04M 1/67 713/186 |
| 2005/0278776 A1* | 12/2005 | Kitagawa | G06F 21/35 726/3 |
| 2006/0032906 A1* | 2/2006 | Sines | G06K 19/06187 235/380 |
| 2009/0037983 A1* | 2/2009 | Chiruvolu | G06F 21/31 726/4 |
| 2011/0066516 A1* | 3/2011 | Hammad | G06Q 20/3829 705/17 |

(Continued)

*Primary Examiner* — Darshan I Dhruv

(57) ABSTRACT

A computer implemented method of authenticating a user accessing a secure terminal, comprising obtaining identification information stored in a personal machine readable storage medium exclusively associated with an accessing user attempting to access a secure system, retrieving authentication information exclusively associated with the accessing user from a remote network resource using the identification information, operating one or more privately directed user interfaces to exclusively present to the accessing user a requested alteration to a challenge request generated based on the authentication information and presented via another user interface, receiving a response to the challenge request from the accessing user and granting the accessing user access to the secure terminal in case the response matches the altered challenge request and denying access in case of no match. The privately directed user interface(s) is adapted to make the presentation of the required alteration discernable only by the accessing user.

9 Claims, 7 Drawing Sheets

(56) References Cited

U.S. PATENT DOCUMENTS

| | | | |
|---|---|---|---|
| 2012/0050008 A1* | 3/2012 | Rosener | G07C 9/33 340/5.21 |
| 2012/0240195 A1* | 9/2012 | Weiss | H04L 63/107 726/4 |
| 2014/0109211 A1* | 4/2014 | Suzuki | H04L 63/0838 726/7 |
| 2014/0237562 A1* | 8/2014 | Nandakumar | H04L 63/08 726/5 |
| 2017/0324726 A1* | 11/2017 | Alleaume | G06F 3/167 |
| 2017/0346757 A1* | 11/2017 | Achtner | H04L 67/20 |
| 2019/0340347 A1* | 11/2019 | Long | G09F 3/207 |

* cited by examiner

PRIVATE AUDIO-VISUAL FEEDBACK FOR USER AUTHENTICATION

BACKGROUND

The present invention, in some embodiments thereof, relates to authenticating a user accessing a secure terminal, and, more specifically, but not exclusively, to authenticating a user accessing a secure terminal according to a user response to a requested challenge request alteration presented exclusively to the accessing user through a privately directed user interface.

Secure terminals, specifically publicly placed secure terminals such as, for example, Automated Teller Machines (ATM), automated kiosks, vending machines for food & beverage, automated ticket purchasing stations and/or the like require high level of authentication due to the sensitivity of a financial transaction conducted by users accessing the secure terminals in an uncontrolled and public environment.

Such secure terminals therefore apply at least some authentication measures for authenticating the users attempting to access them. An example of such authentication is the usage of one or more personal machine readable storage mediums which are exclusively associated with each user attempting to access a secure terminal. The personal machine readable storage medium, for example, a magnetic card, a smartcard, a key fob, a Radio frequency Identification (RFID) tag, a Universal Serial Bus (USB) device and/or the like stores authentication information exclusively assigned to the accessing user and may be used for verifying the accessing user is knowledgeable of the authentication information and is hence assumed to be the person he claims to be, i.e. the accessing user is authenticated.

SUMMARY

According to a first aspect of the present invention there is provided a computer implemented method of authenticating a user accessing a secure terminal, comprising using one or more processors for:

Obtaining identification information stored in a personal machine readable storage medium exclusively associated with an accessing user attempting to access a secure system.

Retrieving authentication information exclusively associated with the accessing user from a remote network resource using the identification information.

Operating one or more privately directed user interfaces to exclusively present to the accessing user a requested alteration to a challenge request generated based on the authentication information and presented via another user interface. The one or more privately directed user interfaces are adapted to make the presentation of the required alteration discernable only by the accessing user.

receiving a response to the challenge request from the accessing user;

Granting the accessing user access to the secure terminal in case the response matches the altered challenge request and denying access in case the response is does not match the altered challenge request.

According to a second aspect of the present invention there is provided a system for authenticating a user accessing a secure terminal, comprising:

A program store storing a code.

One or more processors of a secure terminal coupled to the program store for executing the stored code. The code comprising:

Code instructions to obtain identification information stored in a personal machine readable storage medium exclusively associated with an accessing user attempting to access a secure system.

Code instructions to retrieve authentication information exclusively associated with the accessing user from a remote network resource using the identification information.

Code instructions to operate one or more privately directed user interfaces to exclusively present to the accessing user a requested alteration to a challenge request generated based on the authentication information and presented via another user interface. The one or more privately directed user interfaces are adapted to make the presentation of the required alteration discernable only by the accessing user.

Code instructions to receive a response to the challenge request from the accessing user.

Code instructions grant the accessing user access to the secure terminal in case the response matches the altered challenge request and deny access in case the response is does not match the altered challenge request.

Generating the altered challenge request and exclusively presenting it to the accessing user may be used as a CAPTCHA (Completely Automated Public Turing test to tell Computers and Humans Apart) in order verify that the attempt to access the secure terminal is done by a human user physically accessing the secure terminal. Remote accesses to the secure terminal may thus be prevented since only the accessing user physically located at the secure terminal and presented with the required alteration may correctly respond to challenge request. Moreover, the required alteration is presented to the accessing user via the privately directed user interface thus only the accessing user is capable to discern the required alteration while no other persons, sensors, devices, systems and/or the like may eavesdrop on the required alteration. As result the correlation between the challenge request and the response provided by the accessing user is concealed from anyone who is not exposed to the required alteration.

According to a third aspect of the present invention there is provided a system for authenticating a user accessing a secure terminal, comprising:

A program store storing a code.

One or more processors of a secure terminal coupled to the program store for executing the stored code. The code comprising:

Code instructions to obtain identification information stored in a personal machine readable storage medium exclusively associated with an accessing user attempting to access a secure system.

Code instructions to retrieve authentication information exclusively associated with the accessing user from a remote network resource using the identification information.

Code instructions to operate one or more directed speakers to present to the accessing user a requested alteration to a challenge request generated based on the authentication information and presented via another user interface. The one or more directed speakers are adapted to emit a narrow sound beam audible only to the accessing user.

Code instructions to receive a response to the challenge request from the accessing user.

Code instructions grant the accessing user access to the secure terminal in case the response matches the altered challenge request and deny access in case the response is does not match the altered challenge request.

The directed speaker technology has greatly advanced in recent times to emit a significantly narrow sound beam enabling only a user located at a very specific location to hear and discern messages generated by the directed speaker. The directed speaker may therefore present a low cost solution which may be very simple to implement and deploy in order to support the exclusive presentation of the required alteration only to the accessing user while no other person, sensor and/or device may intercept the required alteration.

In a further implementation form of the first, second and/or third aspects, the authentication information comprising one or more members of a group consisting of: a private identification number (PIN), a password, a code and a security question. Adapting the authentication system to use authentication information which is already in wide use for a plurality of applications, services and/or systems may significantly improve adoption of the authentication system in such applications, services and/or systems.

In a further implementation form of the first, second and/or third aspects, the personal machine readable storage medium is a magnetic card comprising a magnetic band for coding the authentication information. Adapting the authentication system to operate with currently existing secure terminals which widely use magnetic cards may significantly improve adoption of the authentication system with applications, services and/or systems utilizing such secure terminals.

In a further implementation form of the first, second and/or third aspects, the personal machine readable storage medium is a smart card comprising an integrated card for storing the authentication information. Adapting the authentication system to operate with currently existing secure terminals which widely use smart cards may significantly improve adoption of the authentication system with applications, services and/or systems utilizing such secure terminals.

In a further implementation form of the first, second and/or third aspects, the personal machine readable storage medium comprises a Radio Frequency Identification (RFID) component for storing the authentication information. Adapting the authentication system to operate with currently existing secure terminals which widely use RFID technology may significantly improve adoption of the authentication system with applications, services and/or systems utilizing such secure terminals.

In a further implementation form of the first and/or second aspects, one or more of the privately directed user interfaces comprise a privately directed visual interface adapted to generate a visual presentation visible only to the accessing user. The directed visual interface may present a low cost, simple and highly accessible alternative for exclusively presenting the required alteration to the accessing user. For example, using a wearable visual aid (e.g. googles, glasses, etc.) which the accessing user may wear and is hence privately presented with the required alteration and is the only one able to view it. In another example, the directed visual interface may be implemented using a specifically designed, constructed and/or adapted display screen, for example, a restricted visibility display having confining perimeter walls, a polarized screen and/or the like allowing only the accessing user located and/or positioned in a certain predefined location/position with respect to the screen to view information presented on the screen, specifically the required alteration.

In a further implementation form of the first and/or second aspects, one or more of the privately directed user interfaces comprise a wearable audio aid adapted to generate an audible presentation audible only to the accessing user. The wearable audio aid (e.g. headphones, earphones, etc.) may present another low cost, simple and highly accessible alternative for exclusively presenting the required alteration to the accessing user. Using the wearable visual aid which the accessing user is privately presented with the required alteration and is therefore the only one able to hear it.

In a further implementation form of the first and/or second aspects, one or more of the privately directed user interfaces are implemented by a client device associated with the accessing user and adapted to generate a presentation discernable only by the accessing user, the altered challenge request is transmitted to the client device via one or more communication channels. As most user in the modern era carry a mobile device, such as, for example, a smartphone, a tablet, a laptop and/or the like, using the client device of the accessing user for exclusively and privately presenting information, specifically the required alteration may be significantly simple thus avoiding the need to deploy an additional directed user interface at the secure terminal. This may simplify the design, deployment and/or maintenance of the authentication system and may thus reduce its cost, increase reliability and/or the like.

In a further implementation form of the first, second and/or third aspects, the required alteration to the challenge request comprises a request to enter an altered representation of the authentication information. By instructing the accessing user to respond with an altered representation of the authentication information, the authentication information may not be compromised by adversary(s) monitoring the interaction between the accessing user and the secure terminal.

In a further implementation form of the first, second and/or third aspects, the required alteration to the challenge request comprises a request to enter alternative authentication information compared to the authentication information requested by the challenge request. By instructing the accessing user to respond with an alternative representation of the authentication information (e.g. respond with a password instead of a PIN, respond with an answer to $2^{nd}$ security question instead of $1^{st}$ security question, etc.), the authentication information may be further protected from being compromised by adversary(s) monitoring the interaction between the accessing user and the secure terminal. Moreover, no correlation may be established between the challenge request and the alternative authentication information even if the interaction between the accessing user and the secure terminal is monitored and intercepted.

In an optional implementation form of the first, second and/or third aspects, the required alteration is generated randomly. By randomly generating the required alteration which in turn results in a randomly altered presentation of the authentication information, no constant alteration pattern and/or correlation pattern between the challenge request and the altered response are established.

In an optional implementation form of the first, second and/or third aspects, one or more additional required alterations are generated for one or more another challenge requests presented to the accessing user to further authenticate the accessing user. Additional challenge requests and respective required alteration may be presented to the accessing user in order to further authenticate the accessing user and/or to allow the accessing user another opportunity to access the secure terminal in case he failed to properly respond to a previous challenge request(s).

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
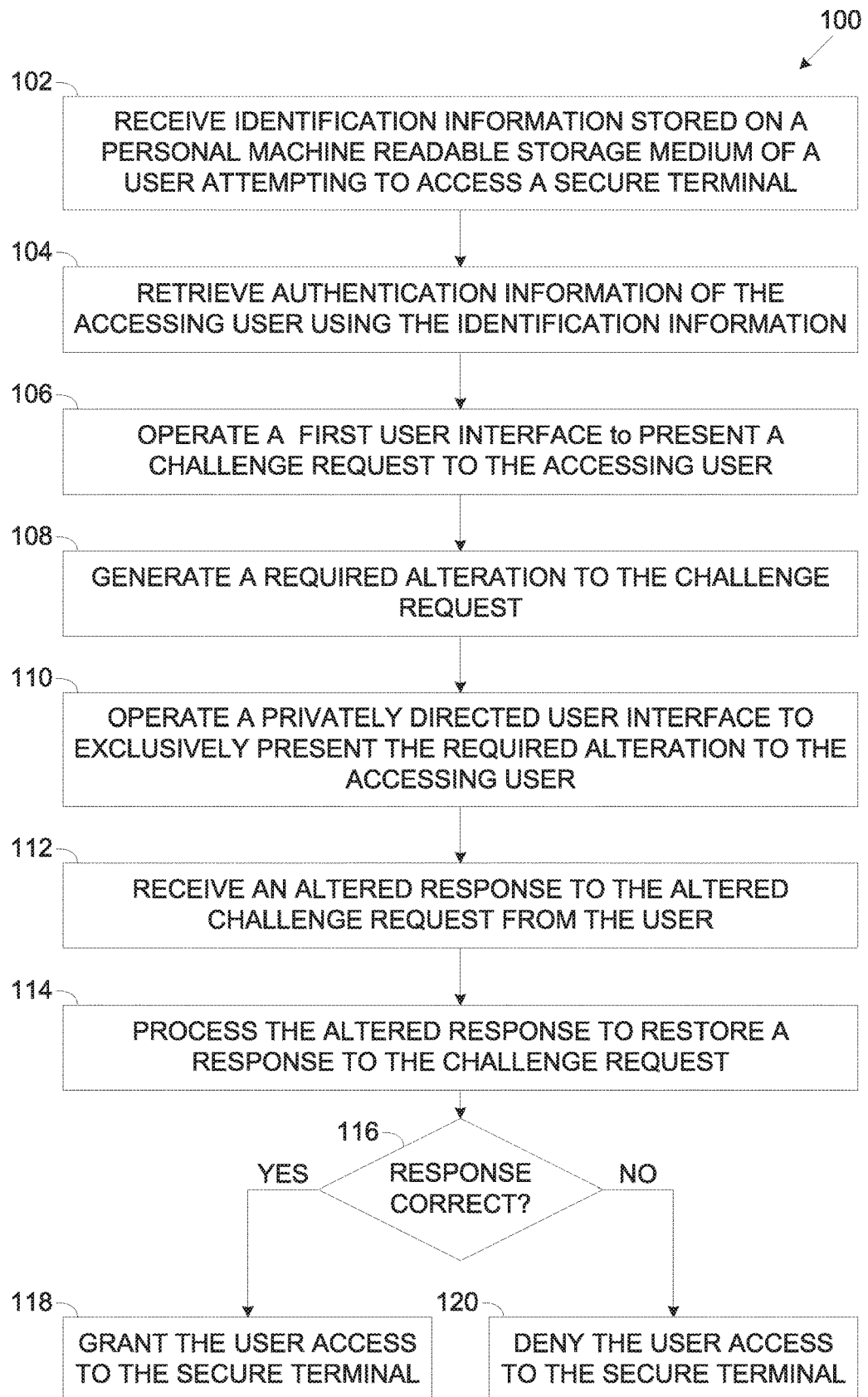
FIG. 1 is a flowchart of an exemplary process of authenticating a user accessing a secure terminal, according to some embodiments of the present invention.

The present invention, in some embodiments thereof, relates to authenticating a user accessing a secure terminal, and, more specifically, but not exclusively, to authenticating a user accessing a secure terminal according to a user response to a requested challenge request alteration presented exclusively to the accessing user through a privately directed user interface.

Granting access to a secure terminal, for example, an Automated Teller Machine (ATM), an automated kiosk, a vending machine, a computer terminal, a laptop computer, a door digital lock (with keypad) and/or the like is typically based on a two-factor authentication requiring something the user attempting to access the secure terminal possess (has) and something the accessing user knows. Many such secure terminals apply the two-factor authentication by requesting the accessing user to provide (1) a personal machine readable storage medium exclusively associated with the accessing user and (2) a response to a challenge request requesting the accessing user to respond with authentication information exclusively assigned to the accessing user, for example, a Private Identification Number (PIN) code, a password, a code, a security question and/or the like.

The personal machine readable storage medium, for example, a magnetic card, a smartcard, a key fob, a Radio frequency Identification (RFID) tag, a Universal Serial Bus (USB) device and/or the like may store identification information which uniquely identifies the associated user, for example, a name, an identification (ID) number, a social security number, a phone number, a driver's license number, an exclusively assigned subscription/registration number and/or the like.

The secure terminal may obtain the authentication information exclusively assigned the accessing user by accessing a remote authentication information repository storing the authentication information of users registered for the service offered by the secure terminal, for example, a bank database, a credit card company database, a service subscription database and/or the like. The secure terminal may use the identification information retrieved from the personal machine readable storage medium as an index and/or for a query for retrieving the authentication information of the accessing user from the authentication information repository.

Typically the secure terminal presents a challenge request to the accessing user via one or more user interfaces, for example, a screen, a speaker and/or the like requesting the accessing user to respond (provide, enter, insert, etc.) with his exclusively assigned authentication information. The two-factor authentication may thus be verified by comparing the response of the accessing user with the authentication information obtained from the authentication information repository using the identification information retrieved from the personal machine readable storage medium.

According to some embodiments of the present invention, there are provided methods, systems and computer program products for authenticating one or more users attempting to access the secure terminal by presenting a challenge request to the accessing user via the user interface while exclusively presenting to the accessing user a required alteration to the challenge request via a different privately directed user interface, receiving an altered response from the accessing user, and verifying the response, after the alteration is removed, is compliant with the authentication information retrieved from the authentication information repository using the identification information retrieved from the personal machine readable storage medium exclusively associated with the accessing user.

The personal machine readable storage medium is first read to retrieve the identification information of the accessing user. As described herein before, the secure terminal may use the identification information of the accessing user as index and/or for a query to retrieve the authentication information exclusively assigned to the accessing user from the remote authentication information repository.

A challenge request may then be presented to the accessing user via one or more of the user interfaces of the secure terminal requesting the accessing user to respond with his authentication information.

However, in contrast to the existing methods for authenticating the accessing user, in addition to the challenge request presented to the accessing user via the user interface of the secure terminal, the accessing user is also exclusively presented with a required alteration requesting the accessing user to alter the authentication information requested by the challenge request. Therefore, in response to the challenge request coupled with the required alteration, the accessing user should respond to the challenge request with an altered representation of the authentication information rather than with the authentication information itself as requested by the challenge request.

Optionally, the required alteration is generated in a random manner such that the requested altered representation of the authentication information that derives from the required alteration is random.

Optionally, the altered challenge request is constructed to request the accessing user to provide alternative authentication information compared to the authentication information requested by the challenge request. For example, while the challenge request may be constructed to instruct the accessing user to respond with his PIN code, the required alteration may be constructed to instruct the accessing user to respond with his password and/or with an answer to a security question as defined by the authentication information obtained from the authentication information repository for the accessing user.

The required alteration is presented exclusively to the accessing user using a privately directed user interface such that no other persons, sensors, devices, systems and/or the like may discern, eavesdrop, hear and/or view the required alteration. The privately directed user interface may include, for example, a directed speaker, a wearable audio aid, a privately directed visual interface and/or the like. The privately directed user interface may further be utilized by a client device associated with the accessing user, for example, a smartphone, a tablet, a smart watch, a smart goggles, a laptop computer, a desktop computer and/or the like having one or more user interfaces allowing exclusive presentation of the required alteration to the accessing user.

In response to the presented challenge request and the exclusively presented require alteration, the accessing user may provide (e.g. enter, insert, type, etc.) an altered response using one or more user interfaces of the secure terminal, for example, a keyboard, a keypad, a touchscreen, a pointing device and/or the like.

The altered response provided by the accessing user in response to the challenge request and the required alteration is processed to remove the required alteration and restore the response to the challenge request. For example, assuming the required alteration requested the accessing user to provide an altered representation of the authentication information requested by the challenge request, the altered response comprising the altered representation of the authentication information may be processed to restore the actual presentation of the authentication information.

The correctness of the restored response may be verified by comparing the restored representation of the authentication information to the actual authentication information retrieved from the authentication information repository. In case the response is correct (i.e. the restored representation matches the actual representation of the authentication information) the accessing user may be granted access to the secure terminal and in case the response is incorrect (i.e. the restored representation does not match the actual representation of the authentication information) the accessing user is denied from accessing the secure terminal.

Optionally, one or more additional challenge requests coupled with respective required alterations are presented to the accessing user in order to further authenticate him and/or to allow the accessing user another opportunity to access the secure terminal in case of failure to correctly respond to a previous altered challenge request.

Generating the altered challenge request and exclusively presenting it to the accessing user may present significant advantages and benefits compared to currently existing methods and systems for accessing secure terminals. First, presenting the required alteration may be used as a CAPTCHA (Completely Automated Public Turing test to tell Computers and Humans Apart) in order verify that the attempt to access the secure terminal is done by a human user physically accessing the secure terminal since only the accessing user physically located at the secure terminal and presented with the required alteration may correctly respond to challenge request. This may prevent compromise of the secure terminal by one or more adversaries attempting to access the secure terminal remotely over one or more networks. This is highly advantageous over the existing systems which may be highly susceptible to such remote access by adversary(s) who somehow gained access to the authentication information.

Moreover, the required alteration is presented to the accessing user via the privately directed user interface thus only the accessing user is capable to discern, i.e. hear, view and/or comprehend the required alteration while no other persons, sensors, devices, systems and/or the like may discern, eavesdrop, hear and/or view the required alteration. As result the correlation between the challenge request and the response provided by the accessing user is concealed from anyone who is not exposed to the required alteration exclusively presented to the accessing user, i.e. from anyone except for the accessing user. This may be of particular advantage when the secure terminal, for example, an ATM terminal, an automated kiosk and/or the like is located in an uncontrolled public area which may be crowded with people. In such scenarios, the user interface(s) of the secure terminal are prone to eavesdropping by sensors (e.g. cameras, microphones, etc.), devices and/or the like deployed by adversary(s) to monitor interaction of accessing users with the secure terminal, specifically the challenge request(s) and the responses of the accessing user(s) in attempt to capture the authentication sequence and information. While the adversary(s) may intercept the interaction of the accessing user(s) with the secure terminal, no correlation may be made between the challenge request and the altered response of the accessing user since the altered response does not contain the actual presentation of the authentication information requested by the challenge request but rather the altered representation.

In addition, since the accessing user is requested to respond with an altered and/or alternative representation of the authentication information, the authentication information may not be compromised by persons, sensors, devices, systems and/or the like monitoring the user interface(s) of the secure terminal in attempt to intercept the authentication information entered by the accessing user.

Furthermore, since the required alteration is constructed to instruct the accessing user to respond with a randomly altered presentation of the authentication information, no constant alteration pattern and/or correlation pattern between the challenge request and the altered response are established. As such adversary(s) monitoring the user interface(s) of the secure terminal and intercepting the challenge request and the altered response cannot identify such alteration pattern and/or correlation pattern and naturally may not be able to use such patterns for compromising the secure terminal and/or the privacy of the authentication information of the users.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of authenticating a user accessing a secure terminal, according to some embodiments of the present invention. An exemplary process 100 may be executed to authenticate one or more users attempting to access a secure terminal by exclusively presenting a required alteration to a challenge request presented to the user and verifying the altered response (after removing the alteration) is compliant with authentication information of the accessing user obtained from a repository according to identification information of the accessing user stored in a personal machine readable storage medium exclusively associated with the accessing user.

Figure 2A:
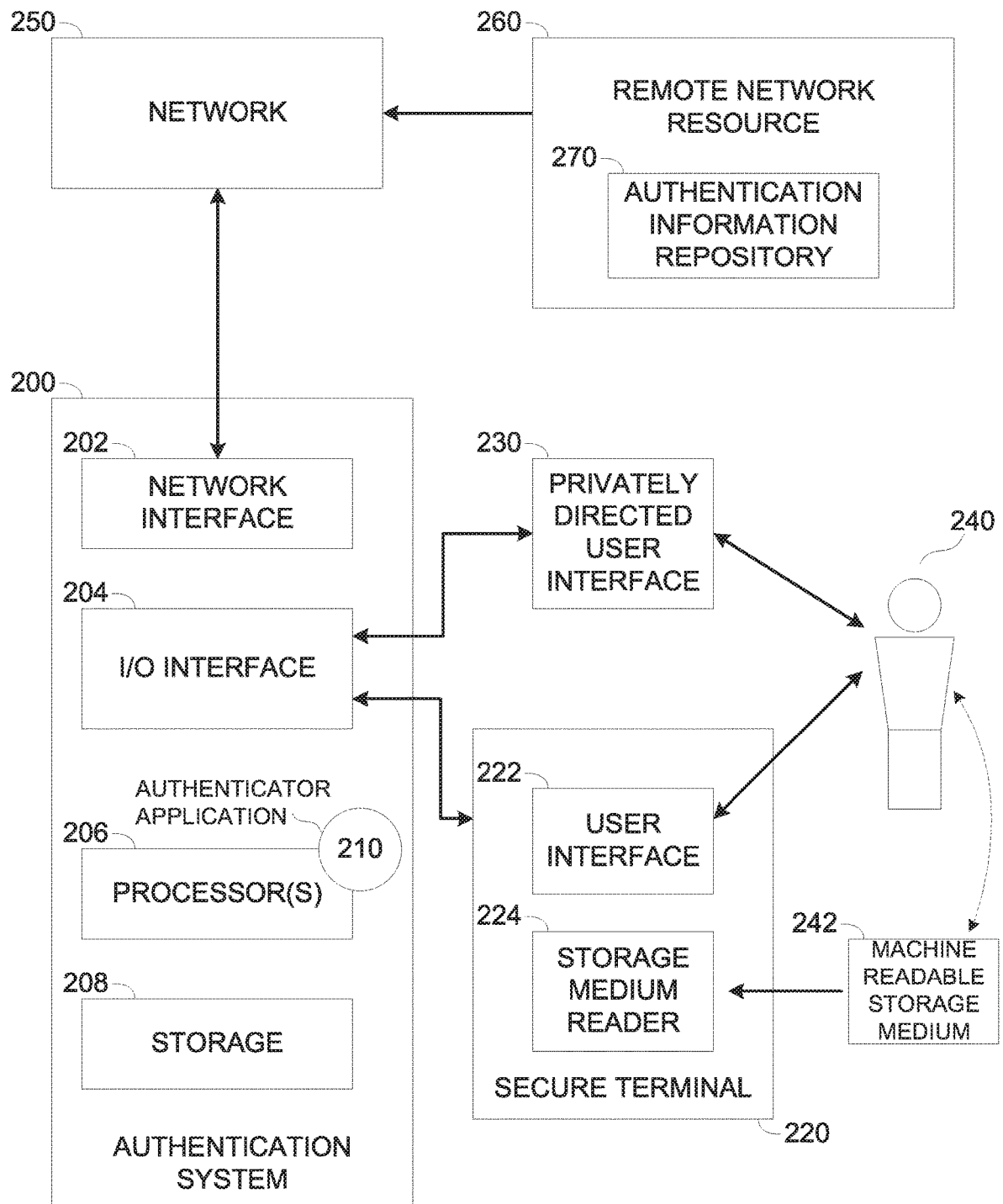
FIG. 2A and FIG. 2B are schematic illustration of exemplary systems for authenticating a user accessing a secure terminal, according to some embodiments of the present invention.
Figure 2B:
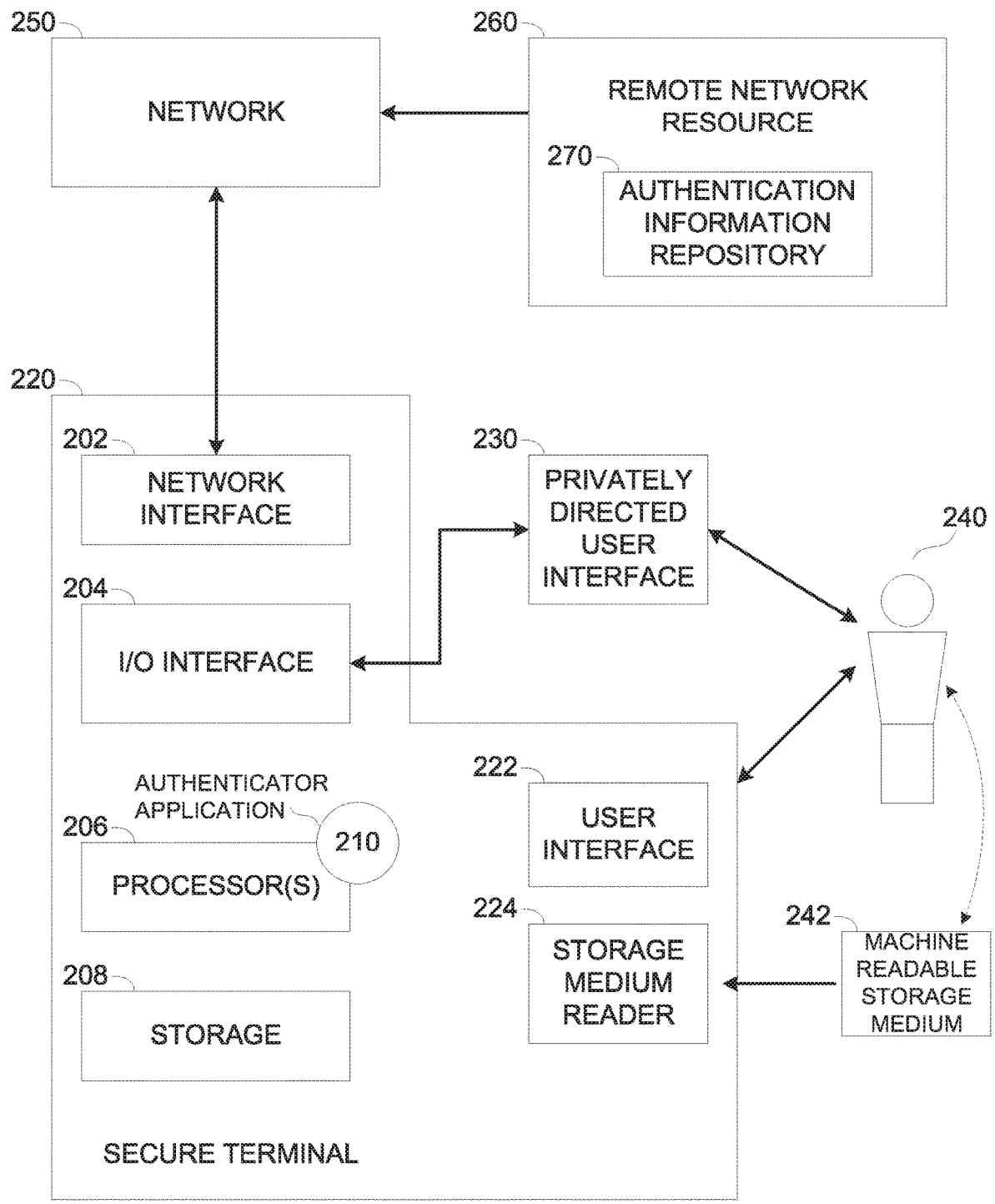

Reference is also made to FIG. 2A and FIG. 2B, which are schematic illustrations of exemplary systems for authenticating a user accessing a secure terminal, according to some embodiments of the present invention. An exemplary authentication system 200 may be used for executing a process such as the process 100 to authenticate a user 240 attempting to access a secure terminal 220, for example, an Automated Teller Machine (ATM), an automated kiosk, a vending machine, a computer terminal, a laptop, a door digital lock (with keypad) and/or the like.

As shown in FIG. 2A, the authentication system 200 may comprise a network interface 202 for connecting to one or more networks 250, an Input/Output (I/O) interface 204 for connecting to the secure terminal 220, a processor(s) 206 and storage 208.

The network interface 202 may include one or more wired and/or wireless interfaces for connecting to the network(s) 250, for example, a Local Area Network (LAN), a Wide Area Network (WAN), a Metropolitan Area Network (MAN), a cellular network, the internet and/or the like to facilitate communication with one or more remote network resources 260. Specifically, the authentication system 200 may communicate with one or more remote authentication information repositories 270 storing authentication information of users registered for the service offered by the secure terminal, for example, a bank database, a credit card company database, a service subscription database and/or the like. The authentication system 200 may typically communicate with the network resource(s) 260, specifically with the authentication information repository(s) 270 using secure communication channels, secure protocols and/or the like to prevent compromising the privacy and authentication information of the accessing user(s) 240.

The I/O interface 204 may include one or more wired and/or wireless interfaces, for example, a LAN interface, a USB interface, a serial interface, a Radio Frequency (RF) interface, a Bluetooth interface, a Wireless LAN (WLAN) interface (e.g. Wi-Fi) and/or the like. Using the I/O interface 204, the authentication system 200 may connect and communicate with the secure terminal 220.

Using the I/O interface 204, the authentication system 200 may further connect to one or more privately directed user interfaces 230 adapted to present data exclusively to the accessing user 240, for example, a directed speaker, a wearable audio aid, a privately directed visual interface and/or the like. Additionally and/or attentively, the privately directed user interface 230 may be implemented by one or more client devices of the accessing user 240 with which the authentication system 200 may communicate via the network(s) 250. The data exclusively presented to the accessing user 240 by the privately directed user interface 230 is discernable, i.e. audible, viewable, comprehendible and/or the like only by the accessing user 240 such that no other persons, sensors, devices, systems and/or the like may eavesdrop and/or view the exclusively presented data.

The processor(s) 204, homogenous or heterogeneous, may include one or more processors arranged for parallel processing, as clusters and/or as one or more multi core processor(s). The storage 206 may include one or more non-transitory persistent storage devices, for example, a hard drive, a Flash array and/or the like. The storage 206 may also include one or more volatile devices, for example, a Random Access Memory (RAM) component and/or the like.

The processor(s) 206 may execute one or more software modules such as, for example, a process, a script, an application, an agent, a utility, a tool and/or the like each comprising a plurality of program instructions stored in a non-transitory medium (program store) such as the storage 208 and executed by one or more processors such as the processor(s) 206. For example, the processor(s) 206 may execute an authenticator application 210 to execute a process such as the process 100 for authenticating the accessing user 240.

The secure terminal 220 may typically include a user interface 222, a storage medium reader 224 and one or more processors supported by storage and/or memory devices for controlling the operation of the secure terminal 220. The user interface 222 may include one or more Human-Machine Interfaces (HMI), for example, a keyboard, a screen, a touchscreen, a pointing device, a speaker, a microphone and/or the like for interacting with the accessing user 240.

The reader 224 may include one or more readers adapted to read data stored in one or more types of personal machine readable storage mediums 242, for example, a magnetic card, a smartcard, an RFID component, a USB device and/or the like. As such, the reader 224 may include, for example, one or more devices, components and/or circuits adapted to read (retrieve) information stored in a magnetic band of the magnetic card. In another example, the reader 224 may include one or more devices, components and/or circuits adapted to make contact with an Integrated Circuit (IC) located on a contact type smartcard for retrieving information stored in the IC. In another example, the reader 224 may include one or more devices, components and/or circuits adapted to receive information transmitted in an RF transmission by an RFID component located on a contactless type smartcard, an RFID tag, a key fob and/or the like. The reader 224 may further include one or more devices, components and/or circuits adapted to wirelessly power the RFID component while the RFID component is located in close proximity to the reader 224, for example, through a magnetic charging field. In another example, the reader 224 may include one or more devices, interfaces, components and/or circuits adapted to read (retrieve) information stored in a non-volatile memory of a USB device.

The authentication system 200 may typically be integrated with the secure terminal 220 as shown in FIG. 2B such that the secure terminal 220 executes the authenticator application 210. In such implementation, the network interface 202, the processor(s) 206 and/or the storage 208 may be the resources of the secure terminal 220. However, as described for FIG. 2A, the authentication system 200 may be independent and may communicate with the secure terminal 220 through the I/O interface 204. Moreover, according to some embodiments of the presented invention the privately directed user interface 230 may be integrated with the authentication system 200 and/or with the secure terminal 220. Therefore, in one or more of the integrated embodiments of the authentication system 200, the I/O interface 204 may be optional.

Reference is now made to FIG. 3A, FIG. 3B, FIG. 3C and FIG. 3D, which are schematic illustrations of exemplary embodiments of an authentication system such as the authentication system 200 for authenticating a user such as the user 240 accessing a secure terminal such as the secure terminal 220, according to some embodiments of the present invention.

Figure 3A:
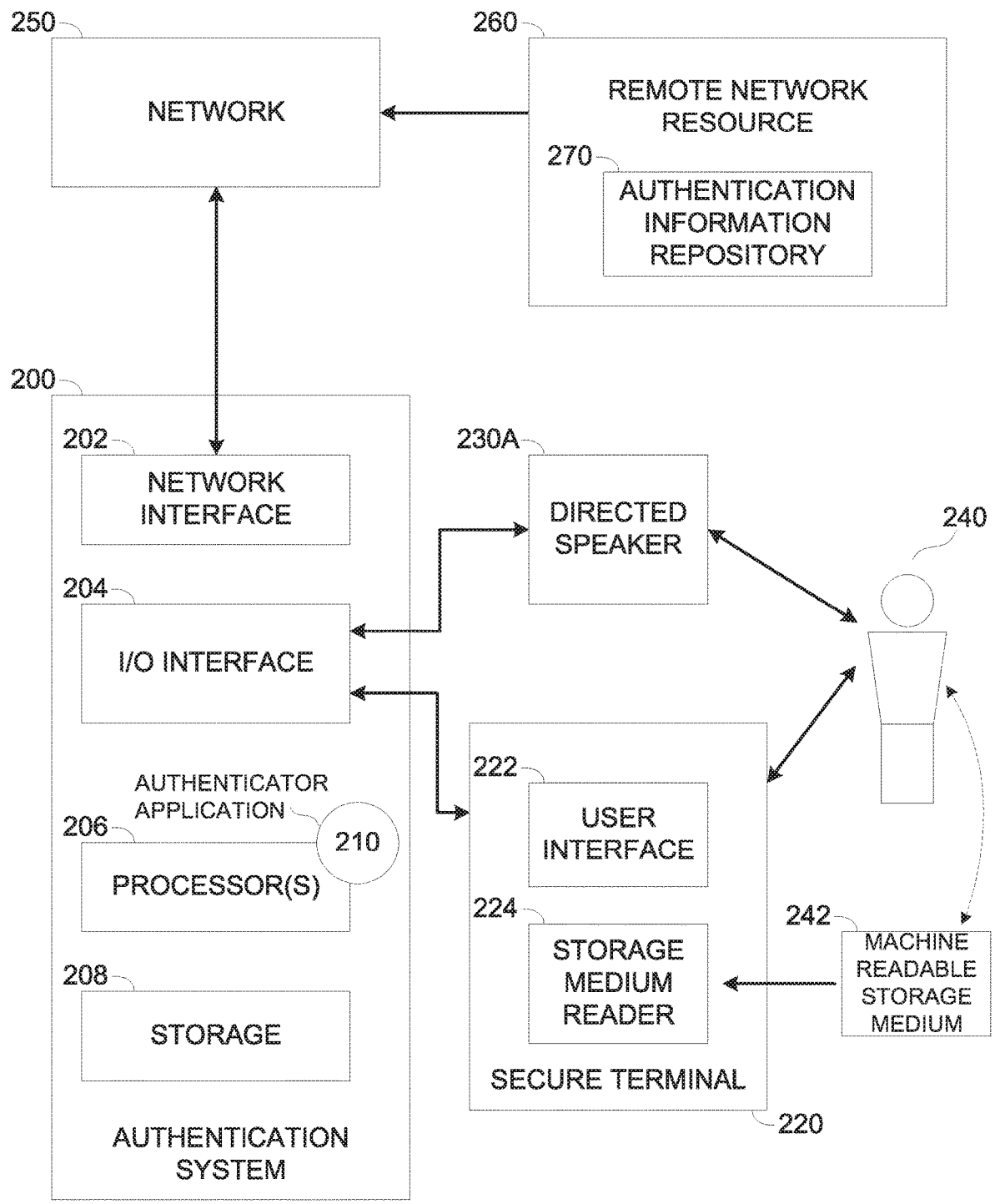
FIG. 3A, FIG. 3B, FIG. 3C and FIG. 3D are schematic illustrations of exemplary embodiments of a system for authenticating a user accessing a secure terminal, according to some embodiments of the present invention.

As shown in FIG. 3A, a privately directed user interface such as the privately directed user interface 230 connected to authentication system 200 is utilized by a directed speaker 230A adapted to emit a narrow sound beam audible only to the accessing user 240 optionally located at a certain designated location with respect to the directed speaker 230A and/or the secure terminal 220. The accessing user 240 is therefore exclusively presented with an audio presentation, for example, a voice, a speech and/or a sound generated using the directed speaker 230A while due to the narrow sound beam, other persons, microphones, sensors, devices and/or the like are incapable to discern, i.e. hear, pick up and/or eavesdrop the audio presentation emitted from the directed speaker 230A.

Figure 3B:
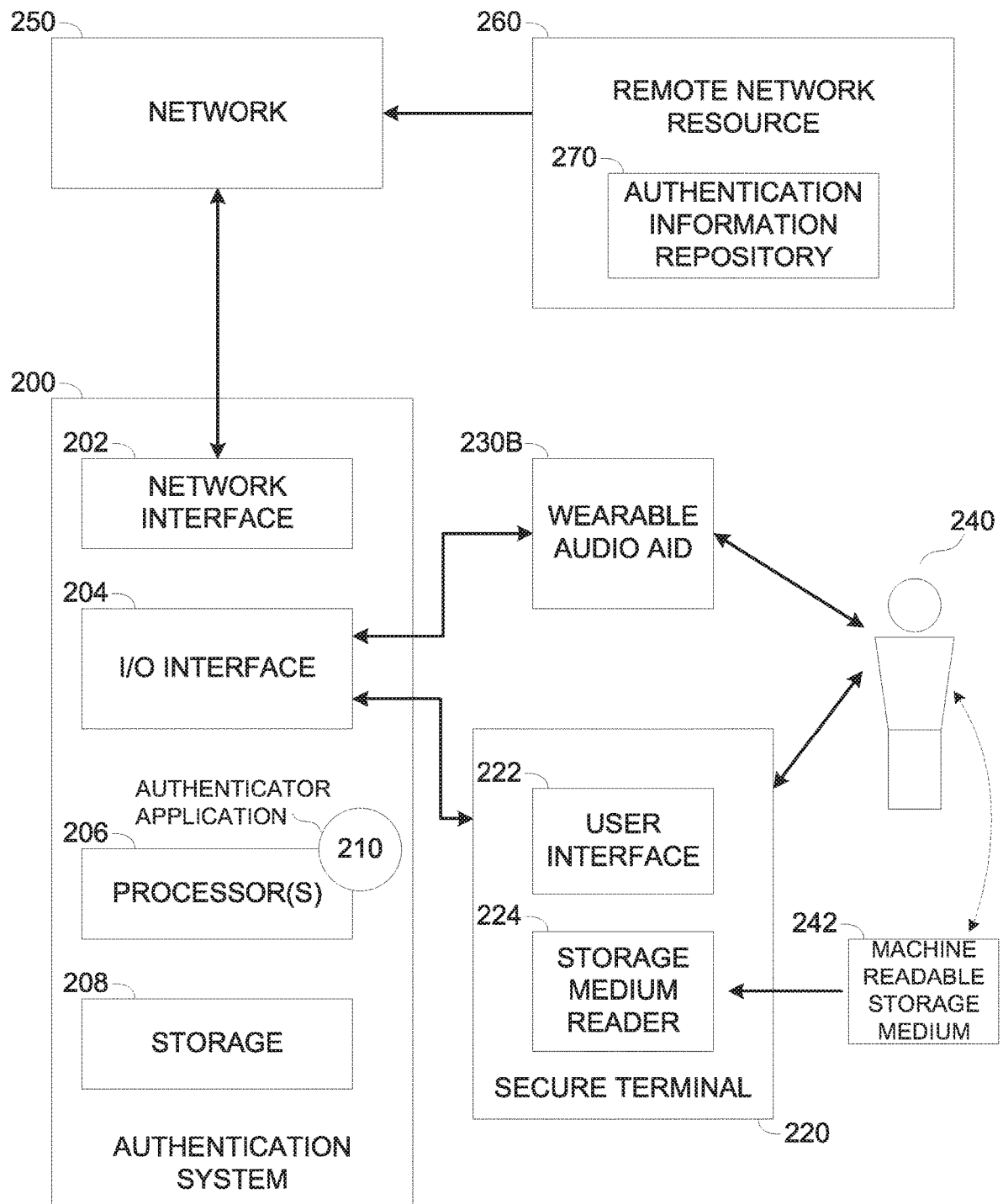

As shown in FIG. 3B, the privately directed user interface 230 connected to authentication system 200 is utilized by a wearable audio aid 230B, for example, a headphone, an earphone and/or the like adapted to fit into and/or over one or both ears of the accessing user 240. Therefore, while wearing the wearable audio aid 230B the accessing user 240 is exclusively presented with the audio presentation generated using the wearable audio aid 230B while other persons, microphones, devices and/or the like are incapable to discern, i.e. hear, pick up and/or eavesdrop the audio presentation.

Figure 3C:
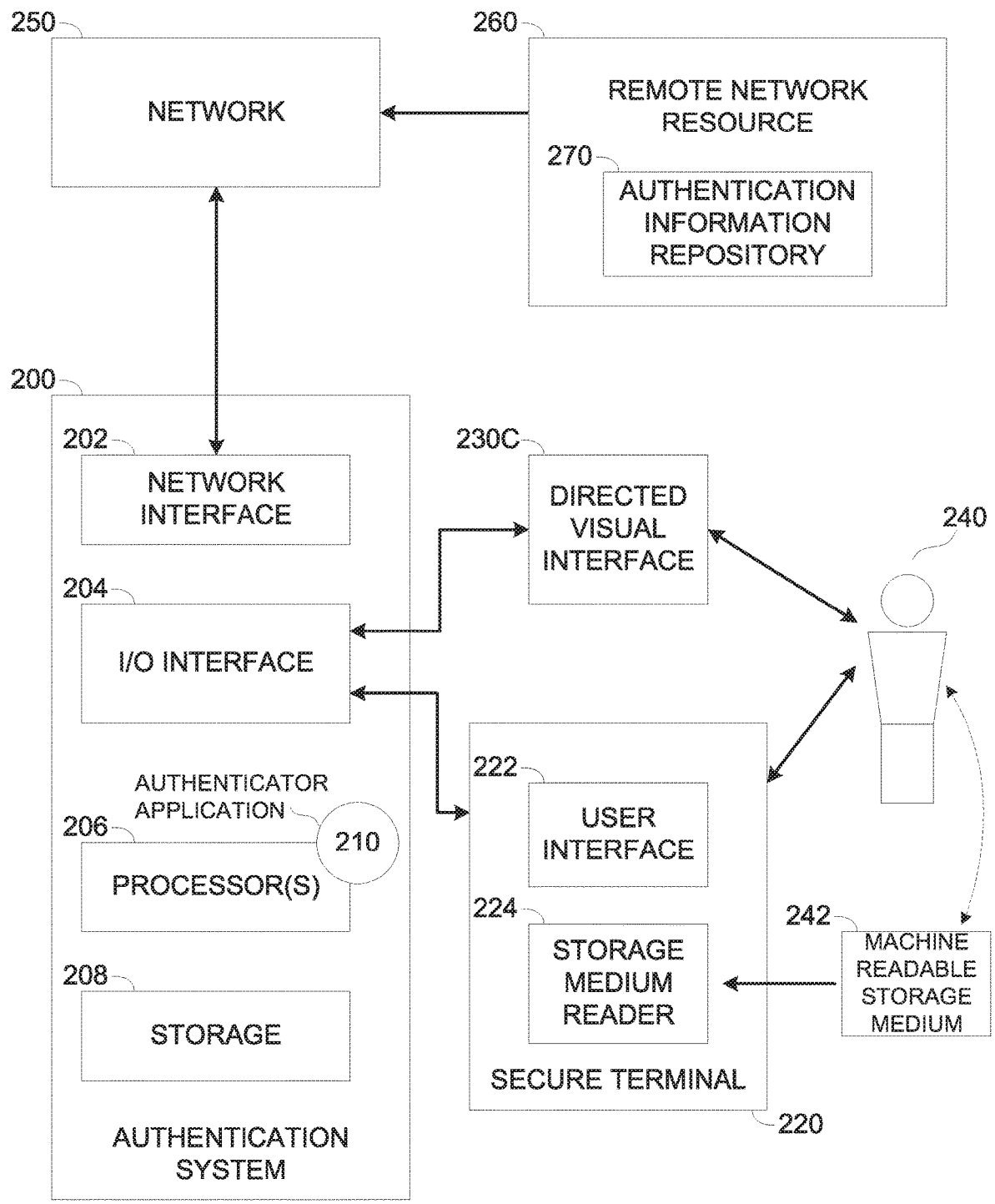

As shown in FIG. 3C, the privately directed user interface 230 connected to authentication system 200 is utilized by a privately directed visual interface 230C. The directed visual interface 230C may include for example, a wearable visual aid, such as for example, glasses, goggles, a Virtual Reality (VR) headset and/or the like adapted to project a visual presentation, for example, text, image and/or a combination thereof on the inner side of the wearable visual aid thus viewable exclusively to the accessing user 240 wearing the wearable visual aid. Therefore, while wearing the wearable visual aid the accessing user 240 is exclusively presented with the visual presentation generated using the wearable visual aid while other persons, cameras, devices and/or the like is incapable to discern, i.e. view, glimpse and/or the like the visual presentation.

In another example, the directed visual interface 230C may be implemented by a restricted view screen adapted to present the visual presentation such that it is viewable only by the accessing user 240 located at a specifically designated location in front of the restricted view screen while any other person, camera, device and/or the like not located in the specifically designated location is incapable to discern, i.e. view, glimpse and/or the like at the visual presentation. For example, the restricted view screen may be implemented by a screen confined with a circumferential wall raised above the screen thus allowing a line of sight to the screen exclusively to the accessing user 240 placing his face in and/or in close proximity to the circumferential wall. Any other person, camera, sensor, device and/or the like which is not in close proximity to the circumferential wall does not have a line of sight to the restricted view screen and is thus incapable to discern the visual presentation on the restricted view screen. In another example, the restricted view screen may be implemented by a polarized screen having a very narrow field of view adjusted to allow only the accessing user 240 located at the designated location in front of the polarized screen to discern the visual presentation on the polarized screen while any other person, camera, device and/or the like not located at the designated location is incapable to discern the visual presentation.

Figure 3D:
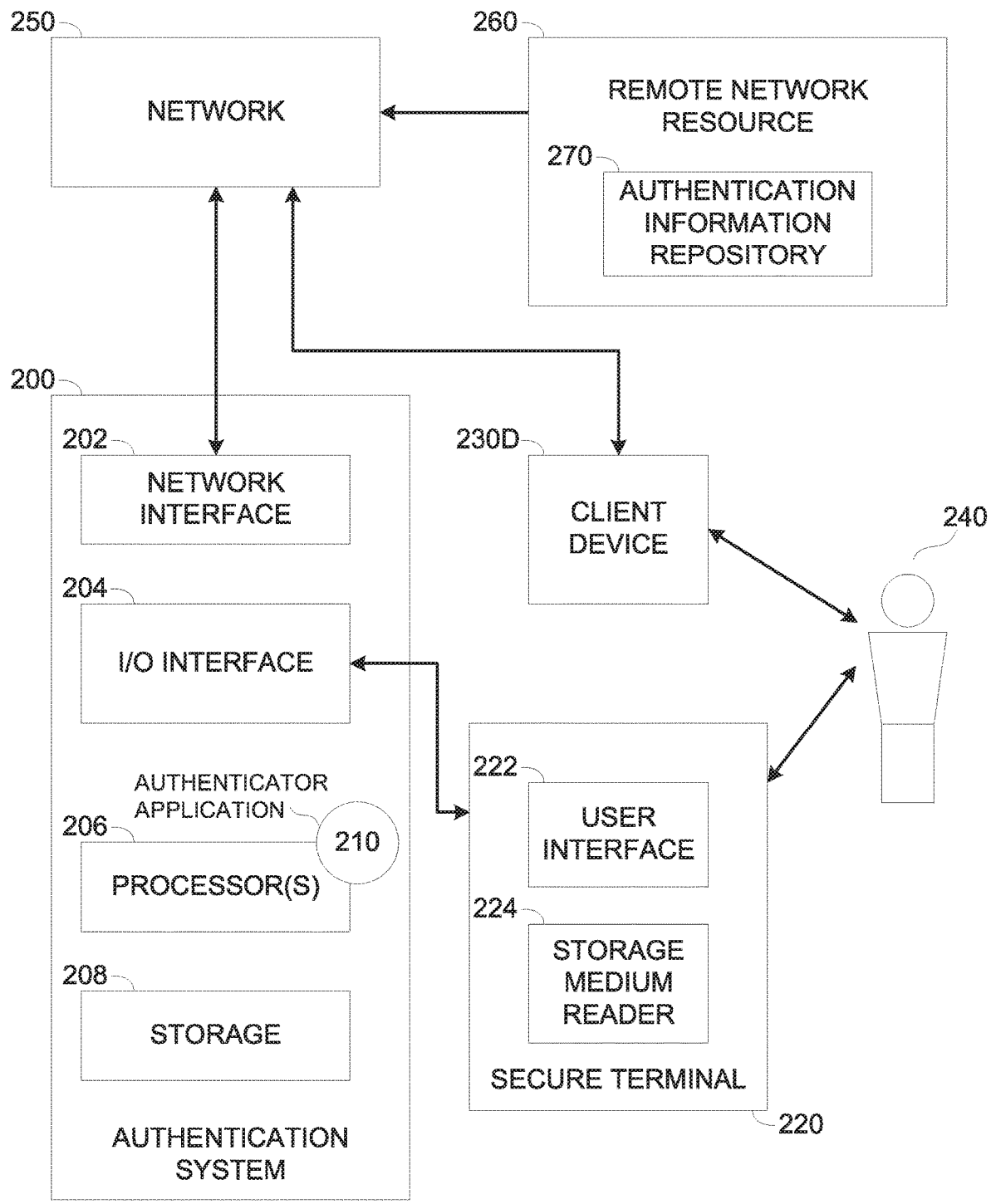

As shown in FIG. 3D, the privately directed user interface 230 may be utilized using one or more user interfaces available in one or more client devices 230D associated with the accessing user 240, for example, a cellular phone, a smartphone, a smart watch, a smart goggles, a tablet, a laptop computer, a desktop computer and/or the like. The authentication system 200 may communicate with the client device 240D through one or more of the networks 250, for example, the cellular network, the internet and/or the like.

One or more implementations and/or combinations thereof may be applied for using the client device 230D as the privately directed user interface 230 for exclusively presenting a presentation, for example, an audio presentation, a visual presentation and/or the like to the accessing user 240. For example, assuming the client device 230D is a smartphone, a smart watch and/or the like, a visual presentation may be presented on a screen of the client device 230D which is significantly small and having a limited field of view thus only viewable by the accessing user 240 while undiscernible by any other persons, cameras, devices and/or the like. In another example, assuming the client device 230D is a wearable visual aid such as, for example, the smart goggles, the VR headset and/or the like, a visual presentation may be presented on the inner side of the wearable visual aid thus exclusively viewable by the accessing user 240 wearing the wearable visual aid. In another example, assuming the client device 230D is a smartphone, a laptop computer, a desktop computer and/or the like, an audible presentation may be presented through a wearable audio aid such as the wearable audio aid 230B connected to the client device 230D.

The embodiments presented in FIG. 3A, FIG. 3B, FIG. 3C and FIG. 3D are described with respect to the implementation of FIG. 2A. However, this should not be construed as limiting since these embodiments may be implemented according to the integrated system construction and deployment described in FIG. 2B.

Reference is made once again to FIG. 1 and FIG. 2A-B.

As shown at 102, the process 100 starts with the authenticator application 210 obtaining (e.g. retrieving, receiving, requesting, probing, collecting, etc.) user information of the accessing user 240, in particular identification information stored in the personal machine readable storage medium 242 associated with the accessing user 240 attempting to access the secure terminal 220.

As part of the sequence for accessing the secure terminal, the accessing user 240 needs to first present his personal machine readable storage medium 242 to the reader 224 of the secure terminal 220 to allow the reader 224 to retrieve (read, receive, fetch, etc.) the identification information stored on the personal machine readable storage medium 242. For example, the accessing user 240 may enter his card, for example, the magnetic card, the smartcard and/or the like to a dedicated slot in the secure terminal 220 where the reader 224 is capable of retrieving the user information stored on the card. In another example, the accessing user 240 may place his RFID component carrier, for example, the RFID tag, the key fob and/or the like in close proximity to the reader 224 to allow the reader 224 to retrieve the user information stored in the RFID component. In another example, the accessing user 240 may insert his associated USB device in a USB port of the reader 224 to allow the reader 224 to retrieve the user information stored in the USB device.

In case the authentication system 200 is independent of the secure terminal 220 as described in FIG. 2A, the authenticator 210 may communicate with the secure terminal 220 to receive the user information retrieved by the reader 224 from the personal machine readable storage medium 242 of the accessing user 240. In case the authentication system 200 is integrated with the secure terminal 220 as described in FIG. 2B, the authenticator 210 may directly collect the user information from the reader 224.

The identification information may include, for example, an identity of the accessing user 240, for example, a name, identification (ID) number, a social security number, a driver's license number, a phone number, an exclusively assigned subscription and/or registration number and/or the like. In case the personal machine readable storage medium 242 is a credit card associated with the accessing user 240, the identification information may further include an account information of the accessing user 240, for example, a banking account number, a credit account number, a debit account number and/or the like.

As shown at 104, the authenticator 210 may access one or more of the remote authentication information repositories 270 storing authentication information of users registered for the service offered by the secure terminal, for example, the bank database, the credit card company database, the service subscription database and/or the like via the network(s) 250 to retrieve the authentication information for the accessing user 240.

The authentication information stored in the authentication information repository(s) 270 may be assigned and/or provided by the users during registration, for example, when setting up an account, when updating the account, when registering for the service and/or the like.

The authenticator 210 may use the identification information retrieved from the machine readable storage medium 242 of the accessing user for retrieving the authentication information of the accessing user 240 from the authentication information repository 270. For example, the authentication information repository 270 may include a database having a plurality of entries, records and/or the like each assigned to a respective user registered to the service offered by the secure terminal 220. The authenticator 210 may therefore use the identification information, for example, as an index, for a query and/or the like to retrieve the authentication information of the accessing user 240 from the authentication information repository 270 database.

The authentication information may include one or more authentication elements, for example, a PIN code, a password, a code, a security question and/or the like.

The authenticator 210 may use the authentication information for authenticating the identity of the accessing user 240 by applying a two-factor authentication procedure in which the authenticator 210 verifies that the accessing user 240 both possess (physically have) the personal machine readable storage medium 242 and knows (have knowledge) the authentication information retrieved from the authentication information repository 270.

As shown at 106, the authenticator 210 may operate the user interface 222 of the secure terminal 220 to present to the accessing user 240 a challenge request generated based on the authentication information retrieved from the authentication information repository 270. For example, assuming the authentication information includes a PIN code assigned to the accessing user 240, the authenticator 210 may operate the user interface 222 to present a challenge request requesting the accessing user 240 to respond with his assigned PIN code. In another example, assuming the authentication information includes a password associated with the accessing user 240, the authenticator 210 may operate the user interface 222 to present a challenge request requesting the accessing user 240 to respond with his password. In another example, assuming the authentication information includes one or more security questions each associated with an answer previously provided (during account setup and/or update for example) by the accessing user 240, the authenticator 210 may operate the user interface 222 to present a challenge request presenting one or more of the security question(s) and requesting the accessing user 240 to answer the security question(s).

As shown at 108, the authenticator 210 generates a required alteration to the presented challenge request constructed to instruct the accessing user 240 to provide an altered representation of the authentication information compared to the authentication information requested by the challenge request presented to the accessing user 240 through the user interface 222.

For example, assuming the authentication information requested by the challenge request presented via the user interface 222 is a PIN code, the accessing user 240 is typically expected to respond with the PIN code. The authenticator 210 may generate a required alteration request instructing the accessing user 240 to respond with an altered representation of the PIN code, for example, the PIN code in reverse order (i.e. last digit first), the PIN code in scrambled order (e.g. swap first and second digits of the PIN code, etc.), the PIN code with one or more additional numbers (e.g. a certain digit added between the second and third digits of the PIN code, etc.), the PIN code without one or more removed numbers (e.g. the second digit of the PIN code is removed, etc.), the PIN code with one or more manipulated number (e.g. a certain digit of the PIN code is added/subtracted/multiplied by a certain factor, etc.), a combination thereof and/or the like. For example, assuming the PIN code is "1234", the authenticator 210 may generate the required alteration to instruct the accessing user 240 to add the digit 5 between the first and second digits of the PIN code such that expected response from the accessing user 240 is "15234".

In another example, assuming the authentication information requested by the challenge request presented via the user interface 222 is a password comprising a sequence of characters. The authenticator 210 may generate a required alteration request instructing the accessing user 240 to respond with an altered representation of the password, for example, add one or more certain characters at the beginning, at the end and/or within the password sequence, replace one or more certain characters of the password sequence with other character(s), remove one or more characters from the password sequence, a combination thereof and/or the like. For example, assuming the password sequence is "mypassword", the authenticator 210 may generate the required alteration to request the accessing user 240 to add the characters "10" between the fourth and fifth characters of the password sequence such that expected response from the accessing user 240 is "mypa10ssword".

In another example, assuming the authentication information is a security question comprising a sequence of characters. The authenticator 210 may generate a required alteration request to instruct the accessing user 240 to respond with an altered representation of the security question as described for the password. For example, assuming the security question is "What was the model of your first owned car?" which is coupled in the authentication information of the accessing user 240 with the answer "Ford" provided by the accessing user 240 during the registration. The authenticator 210 may generate a required alteration request to request the accessing user 240 to respond with a manipulated version of the answer "Ford", for example, the required alteration may be "remove the last two characters of the answer to the security question" such that expected response from the accessing user 240 is "Fo".

Optionally, the authenticator 210 may randomly construct the required alteration request such that altered representation of the authentication information is randomly altered in order to avoid establishing an alteration pattern or a correlation pattern between the required alteration request and the challenge request and/or the actual authentication information which may be identified by one or more adversaries and used for compromising the secure terminal 220 and/or the privacy of the accessing user 240.

For example, assuming the authentication information requested by the challenge request presented via the user interface 222 is a PIN code, the authenticator 210 may randomly generate the altered challenge request to request the accessing user 240 to respond with a randomly altered representation of the PIN code. For example, the required alteration of the PIN code i.e. the reverse order, the scrambled order, the added digits, the removed digits, the manipulated digits, the type of manipulation and/or the like may be randomly selected by the authenticator 210. In another example, assuming the authentication information requested by the challenge request presented via the user interface 222 is a password, the authenticator 210 may randomly generate the required alteration request to instruct the accessing user 240 to respond with a randomly altered representation of the password characters sequence. For example, the type of the altered representation of the password i.e. the added, removed and/or replaced characters may be randomly selected by the authenticator 210.

Optionally, the authenticator 210 may construct the required alteration to instruct the accessing user 240 to respond with alternative authentication information that is different from the authentication information requested by the challenge request. This may further break the correlation between the challenge request and the response provided by the accessing user. For example, assuming the authentication information requested by the challenge request presented via the user interface 222 is a PIN code. The authenticator 210 may generate a required alteration request to instruct the accessing user 240 to respond with his password.

The authenticator 210 may further construct the required alteration to instruct the accessing user 240 to respond with an altered representation of the alternative authentication information. For example, assuming the authentication information requested by the challenge request presented via the user interface 222 is a PIN code. The authenticator 210 may generate a required alteration request to instruct the accessing user 240 to respond with his password in the reverse order. For example, assuming the password is "pass1", the expected response from the accessing user 240 is "1ssap".

As shown at 110, the authenticator 210 operates the privately directed user interface 230 to present a required alteration to the accessing user 240 such that no other persons, sensors, devices, systems, machines and/or the like may discern the required alteration presentation, for example, view, hear, eavesdrop and/or the like.

For example, as shown in FIG. 3A, the authenticator 210 may operate the directed speaker 230A to output the required alteration such that only the accessing user 240 is able to hear the required alteration. For example, assuming the secure terminal 220 is an ATM terminal, the authenticator 210 may operate the directed speaker 230A which may be integrated in the ATM terminal to present the required alteration exclusively to the accessing user 240. In another example, assuming the secure terminal 220 is a laptop computer, the authenticator 210 may operate the directed speaker 230A which may be integrated in the laptop to present the required alteration exclusively to the accessing user 240. The authenticator 210 may further instruct the accessing user 240 to locate himself in a certain designated location and/or position with respect to the directed speaker 230A and/or the secure terminal 220. For example, the authenticator 210 may operate the user interface 222 of the secure terminal 220 to present visual instructions to the accessing user 240 to move to the designated location and/or position. In another example, the authenticator 210 may operate the directed speaker 230A to generate one or more audio patterns (e.g. beep sounds, etc.) to guide the accessing user 240 to move to the designated location and/or position where he clearly hears the audio pattern(s).

In another example, as shown in FIG. 3B, the authenticator 210 may operate the wearable audio aid 230B to output the required alteration such that only the accessing user 240 is able to hear the required alteration. For example, assuming the secure terminal 220 is an ATM terminal, a laptop computer and/or the like, the authenticator 210 may operate the wearable audio aid 230B which may be attached to the ATM terminal or the laptop computer to present the required alteration exclusively to the accessing user 240. The authenticator 210 may instruct the accessing user 240 to wear the wearable audio aid 230B. For example, the authenticator 210 may operate the user interface 222 of the secure terminal 220 to present visual instructions to the accessing user 240 to wear the wearable audio aid 230B.

In another example, as shown in FIG. 3C, the authenticator 210 may operate the visual aid 230C to output the required alteration such that only the accessing user 240 is able to view the required alteration. For example, assuming the secure terminal 220 is an ATM terminal, a laptop computer and/or the like, the authenticator 210 may operate the visual aid 230B which may be integrated and/or attached to the ATM terminal or the laptop computer to present the required alteration exclusively to the accessing user 240. In case of visual aid 230C is the wearable visual aid the authenticator 210 may further instruct the accessing user 240 to wear the wearable visual aid. For example, the authenticator 210 may operate the user interface 222 of the secure terminal 220 to present visual instructions to the accessing user 240 to wear the wearable visual aid.

In another example, as shown in FIG. 3D, assuming the authentication system 200 is able to communicate with the client device 230D via the network 250, for example, the cellular network, the authenticator 210 may transmit the required alteration to the client device 230D associated with the accessing user 240. The client device 230D may then exclusively present the required alteration to the accessing user 240 such that only the accessing user 240 is able to view and/or hear the required alteration. For example, assuming the client device 230D is a smartphone, a smart watch, a smart goggles and/or the like associated with the accessing user 240, the authenticator 210 may transmit a text message, a voice message, a visual message and/or a combination thereof comprising the required alteration to the client device 230D. The client device 230D may then use one or more of its integrated user interfaces, for example, a screen, a speaker, a wearable audio aid, a wearable visual aid and/or the like to exclusively present the altered challenge response to the accessing user 240 as described herein before.

As shown at 112, the authenticator 210 receives from the accessing user 240 an altered response to the challenge request coupled with the required alteration. The accessing user 240 may use the user interface 222 of the secure terminal 220, for example, a keyboard, a keypad, a touchscreen, a pointing device and/or the like to enter the altered response.

As shown at 114, the authenticator 210 may process the altered response received from the accessing user 240 to restore an actual response to the challenge request. As such, the authenticator 210 restores the representation of the authentication information from the altered representation of the authentication information provided by the accessing user 240 in the altered response. For example, assuming the challenge request indicated the accessing user 240 to provide his 4 digits PIN code, and the required alteration is to add the digit 5 between the first and second digits of the PIN code. In such case the authenticator 210 restores the representation of the authentication information by removing the digit 5 inserted between the first and second digits of the altered representation of the PIN code.

As shown at 116, which is a conditional step, in case the restored response of is correct the process 100 branches to 118 and in case the restored response is incorrect the process 100 branches to 120. The authenticator 210 evaluates the restored representation of the authentication information compared to the authentication information of the accessing user 240 obtained from the authentication information repository 270. In case the restored representation matches the authentication information of the accessing user 240, the authenticator 210 may determine the response is correct and the accessing user 240 is positively authenticated. In case the restored representation does not match the authentication information of the accessing user 240 the response is incorrect and authentication of the accessing user 240 fails.

In case the authenticator 210 constructs the required alteration (step 110) to instruct the accessing user 240 to provide the alternative authentication information compared to the authentication information requested by the challenge request, the authenticator 210 may evaluate the altered response of the accessing user 240 compared to the alternative authentication information obtained from the authentication information repository 270. Moreover, in case the required alteration further instructed the accessing user 240 to provide the altered representation of the alternative authentication information, the authenticator 210 may process the altered representation of the alternative authentication information to restore the actual representation of the authentication information as provided by the accessing user 240 as described in step 114. After processed, the authenticator 210 may compare the restored alternative authentication information to the respective alternative authentication information retrieved from the authentication information repository 270.

Optionally, the authenticator 210 initiates one or more additional iterations of the process 100, specifically the steps 104 through 116 where in each iteration an additional challenge request coupled with a respective required alteration is presented to the accessing user 240 and his altered response is evaluated for correctness. For example, in order to further authenticate the accessing user 240, the authenticator 210 may require the accessing user 240 to respond to 3 challenge requests each coupled with a respective required alteration. In another example, in case the accessing user 240 fails to correctly respond to the challenge requests coupled with the required alteration, the authenticator 210 may allow the accessing user 240 another opportunity to correctly respond to additional challenge request(s) coupled with respective required alteration(s) in an attempt to access the secure terminal 220.

As shown at 118, the authenticator 210 grants the accessing user 240 access to the secure terminal 220. For example, assuming the secure terminal is an ATM terminal, the authenticator 210 may allow the accessing user 240 to conduct one or more operations at the ATM terminal, for example, draw cash money, deposit cash money, deposit a check, transfer funds and/or the like. In another example, assuming the secure terminal is an automated ticket purchasing station, the authenticator 210 may allow the accessing user 240 to purchase ticket(s) by charging the banking and/or credit/debit account of the accessing user 240.

As shown at 120, the authenticator 210 denies the accessing user 240 from accessing the secure terminal 220.

It is expected that during the life of a patent maturing from this application many relevant systems, methods and computer programs will be developed and the scope of the terms personal machine readable storage medium, authentication elements and directed user interface are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method of authenticating a user accessing a secure terminal, comprising:
   using at least one processor for:
   obtaining identification information stored in a personal machine readable storage medium exclusively associated with an accessing user attempting to access a secure terminal which is a member of a group consisting of: an Automated Teller Machine (ATM), an automated kiosk, a vending machine, and a door digital lock;
   retrieving authentication information exclusively associated with the accessing user from a remote network resource using the identification information, the authentication information is required to verify a response of the accessing user to a challenge request;
   operating at least one user interface to present the challenge request to the accessing user, wherein the at least one user interface is prone to eavesdropping;
   generating a random alteration to the challenge request and compute instructions for the random alteration;
   operating at least one privately directed user interface to exclusively present the random alteration instructions to the accessing user, the at least one privately directed user interface is adapted to make the presentation of the random alteration instructions discernable only by the accessing user;
   receiving a response to the altered challenge request from the accessing user;
   restoring the response to remove the random alteration the accessing user was instructed to apply in order to produce a restored representation of the authentication information; and
   instructing the secure terminal to grant access to the accessing user in case the restored representation matches the authentication information and deny access in case the restored representation does not match the authentication information;
   wherein the at least one privately directed user interface is a member of a group comprising: a privately directed visual interface adapted to generate a visual presentation of the random alteration instructions visible only to the accessing user, a wearable audio aid adapted to generate an audible presentation of the random alteration instructions audible only to the accessing user, a directed speaker adapted to emit a narrow sound beam audible only to the accessing user and a client device associated with the accessing user adapted to generate a presentation discernable only by the accessing user;
   wherein the at least one of the visual presentation, the audible presentation, and the presentation discernable only by the accessing user are generated to be conceived by the accessing user only when the accessing user is located in a designated location to ensure that only the accessing user is presented with the random alteration instructions;
   wherein the authentication information comprising at least one member of a group consisting of: a private identification number (PIN), a password, a code and a security question.

2. The computer implemented method of claim 1, wherein the personal machine readable storage medium is a magnetic card comprising a magnetic band for coding the authentication information.

3. The computer implemented method of claim 1, wherein the personal machine readable storage medium is a smart card comprising an integrated card for storing the authentication information.

4. The computer implemented method of claim 1, wherein the personal machine readable storage medium comprising a radio frequency identification (RFID) component for storing the authentication information.

5. The computer implemented method of claim 1, wherein the required random alteration to the challenge request comprises a request to enter a representation of the authentication information after altered according to the required random alteration.

6. The computer implemented method of claim 1, wherein the required random alteration to the challenge request comprises a request to enter alternative authentication information compared to the authentication information requested by the challenge request.

7. The computer implemented method of claim 1, further comprising generating at least one additional required random alteration to at least one another challenge request presented to the accessing user to further authenticate the accessing user.

8. A system for authenticating a user accessing a secure terminal, comprising:
   a tangible program store device storing a code; and
   at least one processor of a secure terminal coupled to the program store for executing the stored code, the code comprising:
   code instructions to obtain identification information stored in a personal machine readable storage medium exclusively associated with an accessing user attempting to access a secure terminal which is a member of a group consisting of: an Automated Teller Machine (ATM), an automated kiosk, a vending machine, and a door digital lock, code instructions to retrieve authentication information exclusively associated with the accessing user from a remote network resource using the identification information, the authentication information is required to verify a response of the accessing user to a challenge request, code instructions to operate at least one user interface to present the challenge request to the accessing user, wherein the at least one user interface is prone to eavesdropping, code instructions to generate a random alteration to the challenge request and compute instructions for the random alteration, code instructions to operate at least one privately directed user interface to exclusively present the random alteration instructions to the accessing user, the at least one privately directed user interface is adapted to make the presentation of the random alteration instructions discernable only by the accessing user, code instructions to receive a response to the altered challenge request from the accessing user, code instructions to restore the response to remove the random alteration the accessing user was instructed to apply in order to produce a restored representation of the authentication information, and code instructions to instruct the secure terminal to grant access to the accessing user in case the restored representation matches the authentication information and deny access in case the restored representation does not match the authentication information, wherein the at least one privately directed user interface is a member of a group comprising: a privately directed visual interface adapted to generate a visual presentation of the random alteration instructions visible only to the accessing user, a wearable audio aid adapted to generate an audible presentation of the random alteration instructions audible only to the accessing user, a directed speaker adapted to emit a narrow sound beam audible only to the accessing user and a client device associated with the accessing user adapted to generate a presentation discernable only by the accessing user;

wherein the at least one of the visual presentation, the audible presentation, and the presentation discernable only by the accessing user are generated to be conceived by the accessing user only when the accessing user is located in a designated location to ensure that only the accessing user is presented with the random alteration instructions;

wherein the authentication information comprising at least one member of a group consisting of: a private identification number (PIN), a password, a code and a security question.

9. The computer implemented method of claim 1, wherein the privately directed user interface is integrated in the secure terminal.

* * * * *